(12) United States Patent
Farahani

(10) Patent No.: US 10,038,983 B2
(45) Date of Patent: Jul. 31, 2018

(54) SYSTEM AND METHOD FOR ESTIMATING INTEREST IN, ACTIVITY AT AND OCCUPANCY OF A PHYSICAL LOCATION

(71) Applicant: Orcasense, Inc., Walnut, CA (US)

(72) Inventor: Rezsa Farahani, Toronto (CA)

(73) Assignee: ORCASENSE, INC., Walnut, CA (US)

( * ) Notice: Subject to any disclaimer, the term of this patent is extended or adjusted under 35 U.S.C. 154(b) by 707 days.

(21) Appl. No.: 14/709,452

(22) Filed: May 11, 2015

(65) Prior Publication Data

US 2015/0326680 A1    Nov. 12, 2015

Related U.S. Application Data

(60) Provisional application No. 61/991,011, filed on May 9, 2014.

(51) Int. Cl.

| | |
|---|---|
| *G06F 15/18* | (2006.01) |
| *H04W 4/029* | (2018.01) |
| *H04L 29/08* | (2006.01) |
| *H04L 12/26* | (2006.01) |
| *G06N 99/00* | (2010.01) |
| *G06Q 30/02* | (2012.01) |
| *H04W 4/02* | (2018.01) |

(52) U.S. Cl.
CPC .......... *H04W 4/029* (2018.02); *G06N 99/005* (2013.01); *G06Q 30/0261* (2013.01); *H04L 43/10* (2013.01); *H04L 67/20* (2013.01); *H04L 67/22* (2013.01); *H04W 4/028* (2013.01)

(58) Field of Classification Search
CPC ....................... G06K 9/00369; G06Q 30/0201
USPC ......................................................... 706/12
See application file for complete search history.

(56) References Cited

U.S. PATENT DOCUMENTS

2013/0197968 A1*  8/2013  Davis ................... H04L 67/306
                                                        705/7.29

\* cited by examiner

*Primary Examiner* — David R Vincent
(74) *Attorney, Agent, or Firm* — RMCK Law Group, PLC

(57) ABSTRACT

Techniques for determining levels of interest, activity, or occupancy at a physical location can include receiving data corresponding to physical parameters sensed by a plurality of sensors at the physical location. The physical parameters can include temperature, humidity, pressure, sound, distance to an object, visible light, infra-red light, motion of objects, acceleration, magnetic field, vibration, and radio signals. Synthetic variables can be generated based on the received data and can represent a processed or combined value for its corresponding physical parameters. The physical parameters and synthetic variables can be stored in a memory device. One or more indicators for a level of: (i) interest, (ii) activity, or (iii) occupancy at the physical location can be generated based on the received data and the one or more synthetic variables by utilizing a machine learning model and output to a user computing device for display in a user interface.

20 Claims, 4 Drawing Sheets

SYSTEM AND METHOD FOR ESTIMATING INTEREST IN, ACTIVITY AT AND OCCUPANCY OF A PHYSICAL LOCATION

CROSS-REFERENCE TO RELATED APPLICATIONS

This application claims the benefit of U.S. Provisional Application No. 61/991,011, filed on May 9, 2014. The entire disclosure of the above application is incorporated herein by reference.

FIELD

The present disclosure relates to a system and method of estimating various parameters at a physical location and, more particularly, to a system and method of utilizing a plurality of sensors to estimate the interest, activity and occupancy at a physical location.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The efficient use of a physical space or location is important for businesses, as well as individuals. For example, most businesses rent, own or otherwise utilize a physical location. Such physical locations typically are associated with an expense (e.g., a rent payment or property taxes) that the business must pay in order to utilize the physical location. The expense associated with a physical location may be related to the relative size of the physical location. For example, a business may pay a rent that is based on an area (e.g., square footage) of the physical location. The efficient use of the physical location may result in a business lowering its expenses by permitting the rent of a smaller physical location than would otherwise be possible if the physical location was not used as efficiently.

In another example, a business may pay for placing an advertisement at a physical location. Placement of the same advertisement may differ depending on the particular physical location at which it is located. An advertisement in a high-traffic physical location may cost more than in a relatively low-traffic location due to the amount of advertising targets that will potentially see the advertisement. Furthermore, it may be important to not only determine an "activity" level at the physical location, but also determine the amount of interest in the advertisement at the physical location.

A system and method for measuring the amount of interest in, activity at and/or occupancy of a physical location would be desirable.

SUMMARY

A computer-implemented method for determining levels of interest, activity, or occupancy at a physical location is presented. The method can include receiving, at a server computing device having one or more processors, data corresponding to physical parameters sensed by a plurality of sensors at the physical location. The physical parameters can include temperature, humidity, pressure, sound, distance to an object, visible light, infra-red light, motion of objects, acceleration, magnetic field, vibration, and radio signals. The method can also include generating, at the server computing device, one or more synthetic variables based on the received data. Each synthetic variable can correspond to one or more physical parameters and represent a processed or combined value for its corresponding physical parameters. The method can further include storing, by the server computing device and in a memory device associated with the server computing device, the received data and generated synthetic variables. Additionally, the method can include generating, at the server computing device, one or more indicators for: (i) a level of interest, (ii) a level of activity, or (iii) a level of occupancy at the physical location based on the received data and the one or more synthetic variables by utilizing a machine learning model. The method can also include outputting, from the server computing device, the one or more indicators to a user computing device for display in a user interface.

In other aspects, a computing system for determining levels of interest, activity, or occupancy at a physical location is disclosed. The system can include a server computing device having one or more processors, and a non-transitory computer-readable medium storing instructions that, when executed by the one or more processors, cause the server computing device to perform operations. The operations can include receiving data corresponding to physical parameters sensed by a plurality of sensors at the physical location. The physical parameters can include temperature, humidity, pressure, sound, distance to an object, visible light, infra-red light, motion of objects, acceleration, magnetic field, vibration, and radio signals. The operations can also include generating one or more synthetic variables based on the received data. Each synthetic variable can correspond to one or more physical parameters and represent a processed or combined value for its corresponding physical parameters. The operations can further include storing, in a memory device, the received data and generated synthetic variables. Additionally, the operations can include generating one or more indicators for: (i) a level of interest, (ii) a level of activity, or (iii) a level of occupancy at the physical location based on the received data and the one or more synthetic variables by utilizing a machine learning model. Further, the operations can include outputting the one or more indicators to a user computing device for display in a user interface.

BRIEF DESCRIPTION OF THE DRAWINGS

The present disclosure will become more fully understood from the detailed description and the accompanying drawings, wherein.

DETAILED DESCRIPTION

Figure 1:
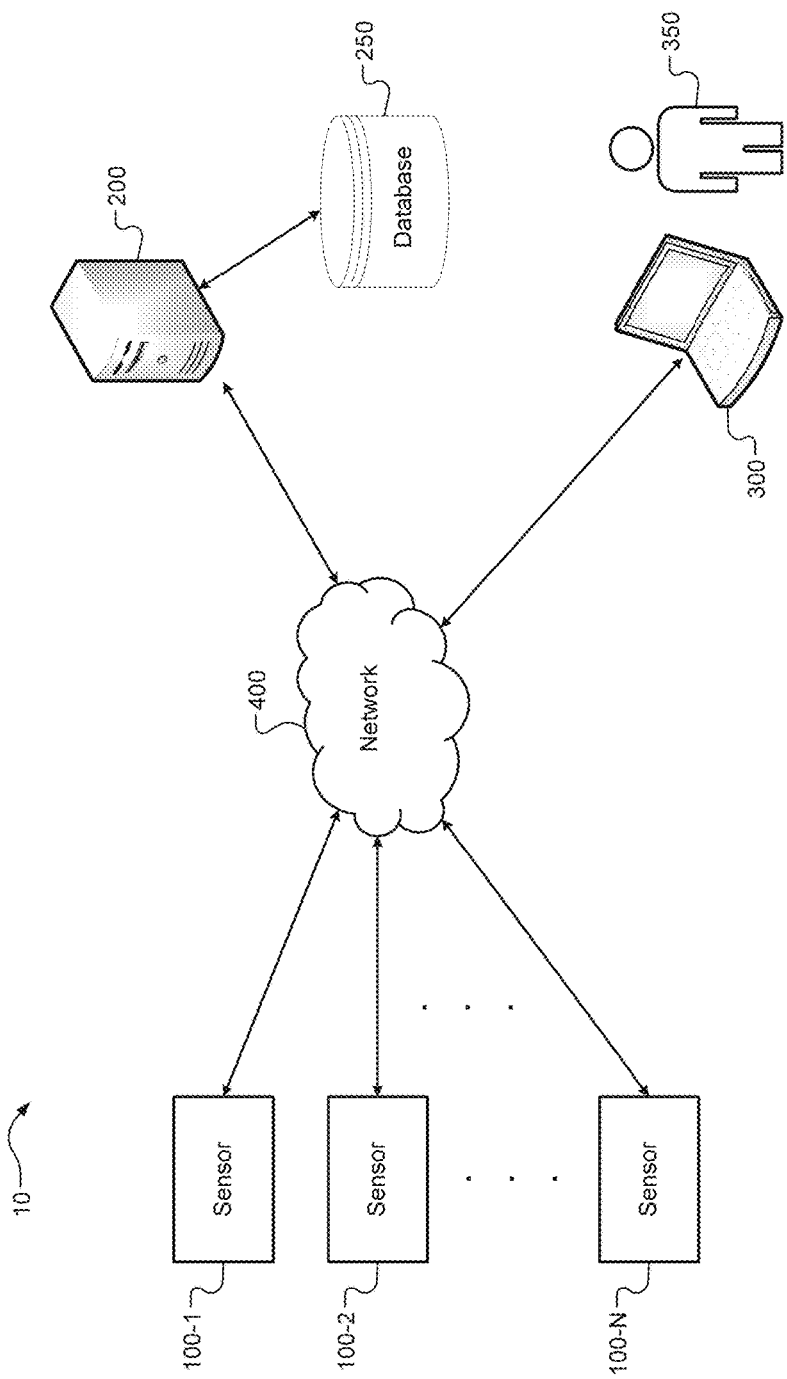
FIG. 1 is a schematic illustration of an example system for estimating interest in, activity at and/or occupancy of a physical location according to some embodiments of the present disclosure.

As briefly mentioned above, an estimate or some other form of measurement of relative levels of interest, activity, and occupancy at physical locations and over time has many applications in commercial and industrial operations. Activity refers to a measure of movement and dynamism at a specific location at a given point in time. For example, in the circumstance where the physical location corresponds to a product rack at a retail store, activity may include the level of movement of shoppers around the device. Interest refers to a measure of relative interest and engagement of a person or persons in a specific item(s) at a physical location. Occupancy refers to a measure of the fullness of a physical location. For example, in a warehouse, occupancy is a relative measure of how full the warehouse is with boxes and items stored.

There are many very beneficial ways to utilize estimated activity, interest and occupancy levels at a physical location. For example, in a shopping center or any other type of a retail location, quantification, measurement, and prediction of the amount of interest and activity related to specific products, product displays, or areas within that location may be valuable since better business decisions in pricing, sales, marketing, and other operations can be made.

In many commercial and industrial settings, communication and interaction with people based on measured or predicted activity levels at a specific location can be valuable. For example at a shopping center, if relative activity at some location is measured or predicted to be low, promotional messages can be sent to nearby shoppers to increase traffic to that area. Similarly, if interest level near a physical advertisement is measured to be high, a purchase offer can be sent to a person's mobile device. Furthermore, it may be beneficial to quantify, measure, and predict activity near physical advertisement displays, where such measurement results in understanding whether an advertisement display at a certain location was or will be successful in receiving attention from people.

Additionally, temporal and spatial data on occupancy allows more efficient and effective management of warehouse operations and the business of renting spaces for storage. In Industrial settings (such as manufacturing facilities, chemical and process plants, oil and gas fields, rigs and platforms, ports and storage areas, and mining sites) measured and predicted values of activity can be used to gauge active and inactive areas for optimizing the movement or layout of people, material and machines, to monitor and control environmental parameters, to monitor for security issues, and to monitor the proper operations of machines, equipment, and people at a specific location at any given point in time. Measurement of activity can also be useful for optimizing and managing supply chains in commercial and industrial operations.

Measured temporal and spatial quantified data on activity, interest and occupancy allows, inter alia, concrete comparisons of the level of success of product marketing and sales campaigns, customer preferences, testing of various business hypotheses, and optimization of operations.

The present disclosure relates to a system and method for measuring interest, activity, and occupancy indicators and interacting with people based on these indicators. One or more sensors are utilized to sense values of physical data. The sensors can measure such physical data over time and from various locations. The system can use such physical data to measure changes, thresholds, and patterns to calculate, detect, and predict relative values of high-level indicators of activity, occupancy, and interest, within or at a physical location. Further, the system can provide a visualization of this data to users by a user interface application, based on specific logic, rules, and algorithms. Based on the calculated indicators and specific rules and the application logic, the system can then communicate and interact with a computing device of the user, such as a mobile computing device (smartphone, tablet or laptop computer, etc.). While each of the individual physical parameters may not strongly correlate with the levels of activity, occupancy, and interest, it has been shown that the aggregation of the plurality of physical parameters (via the sensed data and various synthetic variables discussed below) as a group results in meaningful and accurate relative estimation of the levels of interest, occupancy, and activity.

Referring now to FIG. 1, an example system for measuring interest in, activity at, and occupancy of a physical location is generally indicated with reference number 10. The system 10 includes a plurality of sensors 100-1, 100-2, ... 100-N, where N is an integer greater than or equal to two (hereafter referred to as "sensor(s) 100"). Each of the sensors 100 can be a stand-alone sensor, or can be combined with one or more other sensors 100 into a single sensing device. Thus, the term "sensor(s) 100" as used herein is intended to include a single sensor configured to sense a single physical parameter, as well as a plurality of sensors 100 included in a single sensing device to sense multiple physical parameters and/or provide additional functionality, as described more fully below (e.g., switching lights or other systems on/off, and conveying information via LEDs and/or an attached display). The system 10 further includes one or more server computing devices 200 (hereafter referred to as "server(s) 200"). It should be appreciated that the term "server" as used herein can refer to any suitable computing device, as well as both a single hardware server and a plurality of hardware servers operating in a parallel or distributed architecture. The server 200 can also implement or be in communication with a database 250.

The system can further include one or more user computing devices 300 associated with one or more users 350. It should be appreciated that the term "computing device" can include any form of computer(s) or computer system(s) that include one or more processors for executing instructions. For example only, a computing device can take the form of a desktop computer, a laptop computer, a mobile device (such as a mobile phones, tablets, phablets, and wearable computers), and a server or other distributed computer system, as well as two or more of these example computing devices working together to perform an operation.

The sensors 100, server 200 and user computing devices 300 can communicate with each other through a network 400. The network 400 can include any form of local area network (LAN), wide area network (WAN), e.g., the Internet, or a combination thereof, to which the sensors 100, server 200 and/or user computing device 300 are connected through a wired and/or wireless connection. Operation of these various components are described more fully below.

The sensors 100 sense multiple physical parameter data from various physical locations, and are capable of interacting with the server 200 and user computing devices 300. The server 200 can generate and provide a user interface application for accessing sensed parameter data, device context, and analytics that includes visualization of interest, activity and occupancy indicators based on the processed device data through a browser or mobile device display and using APIs (application programming interface).

The sensors 100 can transmit sensed data wirelessly or wire connected via the network 400 (e.g., the Internet) to one or more servers 200. The sensors 100 can sense one or a combination of multiple parameters related to physical data.

The physical data sensed by the sensors 100 includes, but is not limited to, temperature, distance, humidity, light, sound and noise, motion, acceleration, vibration, pressure, magnetic field, CMOS image, infra-red light, infra-red images, and radio signals (e.g., in the 2.4 and 5 GHz range including all WiFi and Bluetooth standards). The main functionality of the sensors is to collect multiple physical data from their location over time and send this data to the server(s). In some embodiments, the sensors 100 also have additional functionality and can perform control tasks such as switching on/off lights and devices, and convey information using LEDs on the sensor 100. The system 10 can perform massive sensing using a network of many sensors 100. A group of sensors 100 can sense many parameters from the locations which they have been installed.

The server 200 is where data is stored and processed. The server 200 receives data from the sensors 100, and can store this data in the database 250. The server 200 contains both abstract general models and application focused models of a particular deployed system 10. The server 200 processes received data to properly condition and format it for analytics calculations. The server 200 uses various algorithms and methods to calculate both an original and a normalized value for each of the interest, activity, and occupancy indicators based on the sensed physical data received from the sensors 100. Furthermore, the server 200 can use an algorithm to calculate the correlation strength of each sensed parameter with the indicators. The system 10 also uses an algorithm to detect and measure anomalies in the sensed physical parameters. The server 200 can calculate the high-level indicators of interest, activity, and occupancy for the physical location near a sensor 100, as well as for physical location or region containing several sensors 100. The server 200 also allows access to aggregate data, individual sensor data, and analytics via APIs.

The activity and occupancy indicators can be calculated by two separate algorithms for each indicator that superposes the values of the sensed physical parameters that are correlated with activity and occupancy, respectively. Based on these algorithms, the server 200 can output, e.g., time-based, normalized, relative values of activity and occupancy. Based on historic data on activity and occupancy at any given point in time and location along with their corresponding set of values of the sensed physical parameters, the system 10 uses another two algorithms for each activity and occupancy indicators to predict future values of activity and occupancy.

The interest indicator is calculated by the system 10 using an algorithm based on the activity indicator, the sensed physical data, behavioral patterns of people near the sensors 100, and specific rules. For example only, if a sensor 100 is installed near a product rack at a shopping store, if a person spends more than ten seconds near the sensor 100 and a high level of activity is measured, the measured value for interest can be indicated to be high. If a person spends less than ten but more than five seconds with a normal level of activity, interest could be set to be at a medium level, and if a person spends less than five seconds the interest could be set to at a low level.

Based on set conditions and the calculated values of interest, activity, and occupancy, the server 200 can instruct the sensors 100 to interact with persons via their mobile devices, e.g., by sending advertisements, promotions, redirections to other applications/websites/programs, and handling transactions such as purchasing, providing feedback, and user surveys. The interaction can be threshold and rule based, or based on the identification of a certain person near the sensors 100 based on their mobile device ID or direct self-identification after establishing connection with the sensors 100.

The server 200, alone or in combination with the user computing device 300, can generate a user interface that will present the user 350 with a visual indication of the various measurements and estimates of activity, occupancy, and/or interest. The user interface can be presented, e.g., in a computer browser, in a mobile-based application, or as a stand-alone application executing at the user computing device 300. The user interface can display the calculated high-level indicators, such as the levels of activity, interest, and utilization near a certain sensor 100, or within a physical location, area or region that includes several sensors 100. The user interface can further provide an interface for system monitoring, data visualization, and viewing both general and application specific analytics results. The user interface gives access from the highest level business indicators down to device (e.g., sensor 100) level parameter data.

The user interface (e.g., generated by the server 200 and/or user computing devices 300) can visualize the sensed parameters and/or the determined estimated indicators with one, or a combination, of time-series charts, heat maps, scattered point charts, bar charts, pie charts, graph charts, digital area maps, satellite maps, terrain maps, building architectural maps and other data visualization techniques. Via the user interface, the user 350 can use feature tags, search boxes, lists, and drop down buttons and menus, and other selection methods to filter through the calculated indicators and access indicators related to a specific physical location, time, product, customer, promotional and advertisement campaign, and other categories for which the indicators can be calculated. The system 10 also visualizes the change of the indicators over time. Indicator values are calculated both at a total aggregate level, and at a granular area unit level. The user interface can also provide access to device data visualized as time series charts and/or downloadable as various file types.

Figure 2:
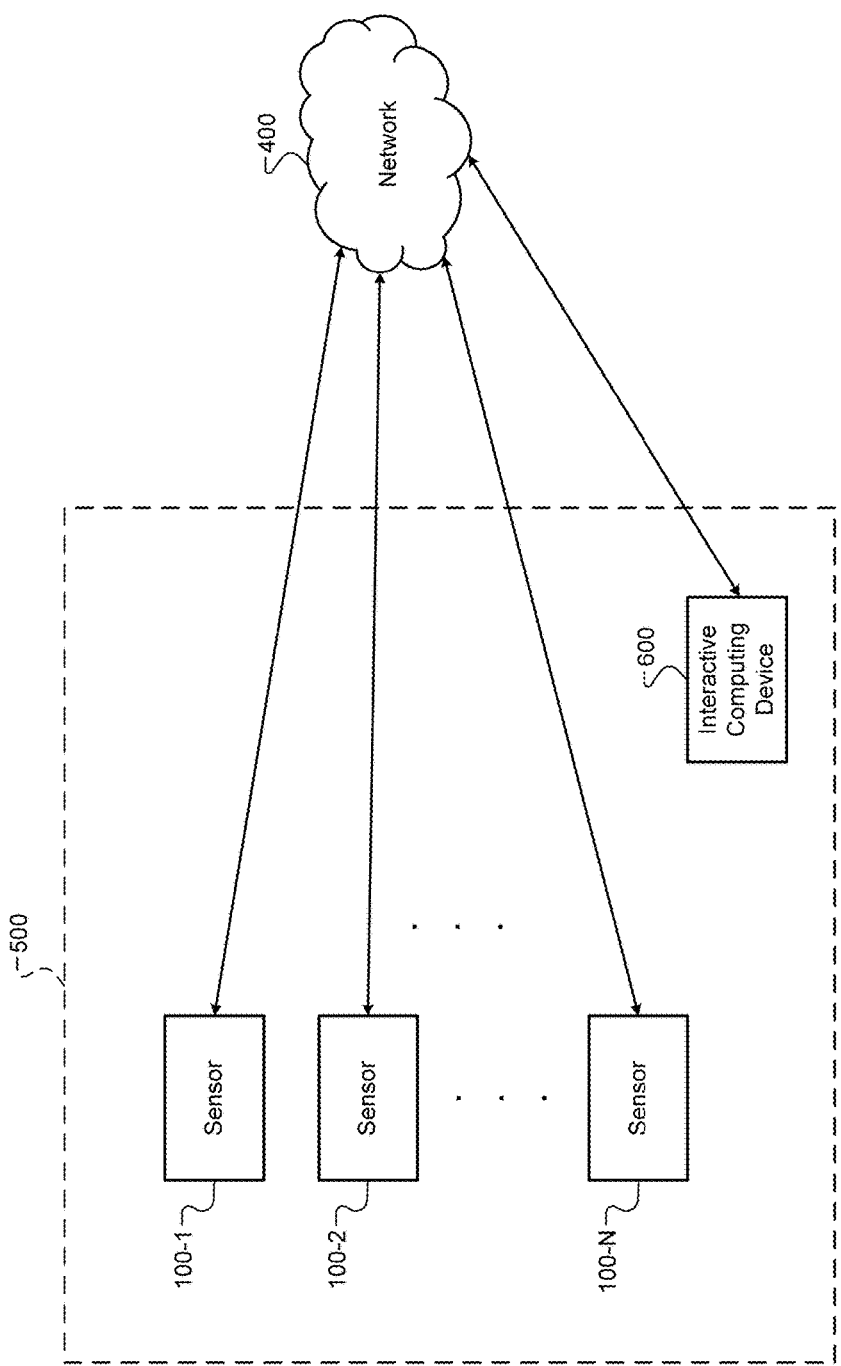
FIG. 2 is a schematic illustration of a portion of the example system of FIG. 1 at a physical location.
Figure 3:
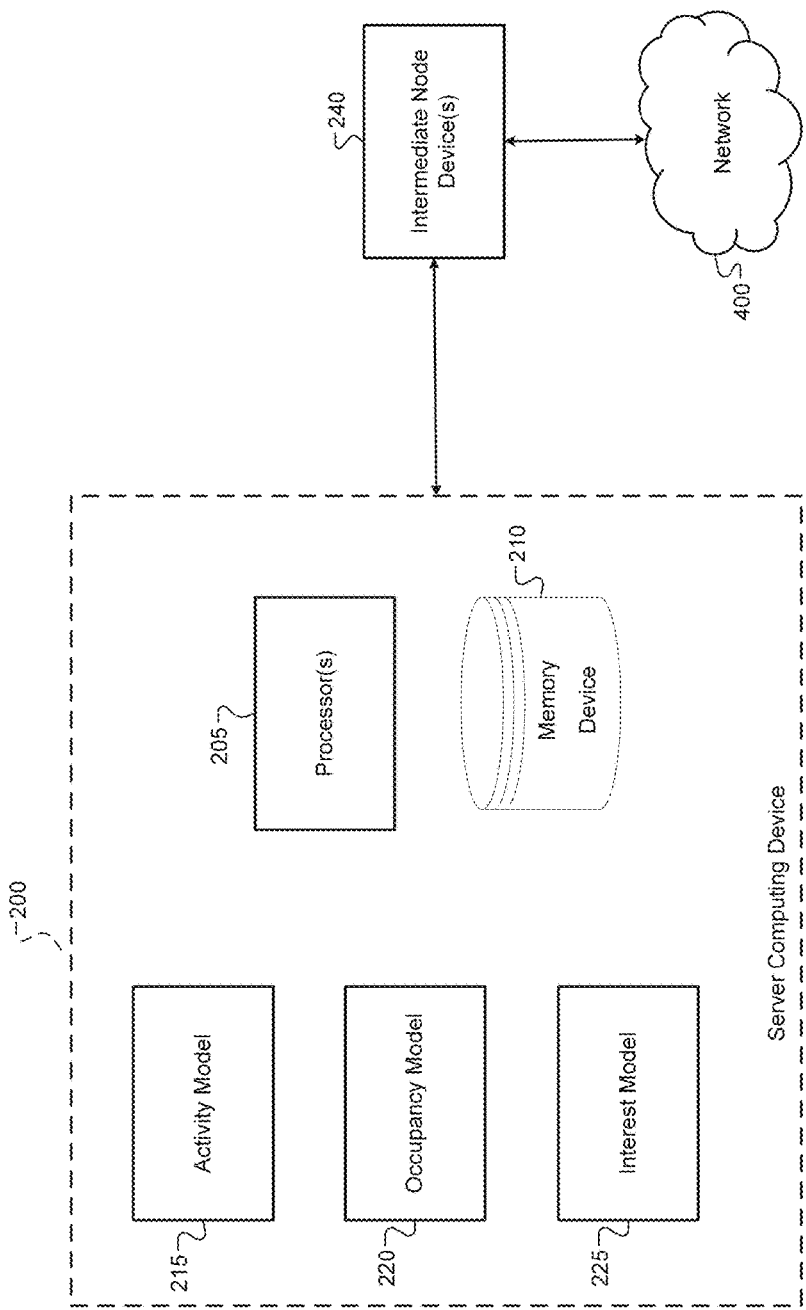
FIG. 3 is a schematic illustration of a server computing device of the example system of FIG. 1.

Referring now to FIGS. 2-3, an example implementation of the system 10 is schematically illustrated. The plurality of sensors 100 can be installed in or at a physical location 500 to sense various physical parameters. These physical parameters, can include, inter alia, temperature, humidity, pressure, sound, distance to an object (e.g., a person), visible light, infra-red light, motion of objects, acceleration, magnetic field, vibration, and radio signals (WiFi signals, Bluetooth signals, etc.).

In some aspects, the sensors 100 are components of an integrated sensing device, e.g., comprising a printed circuit board that contains physical sensors of temperature, humidity, pressure, light, sound, sonar distance, accelerometer, infrared, motion, CMOS image, infrared image, and magnetic field, and which can further include a radio integrated circuit or chip equipped microcontroller module that supports radio communication (e.g., WiFi and Bluetooth Low Energy). In the image sensor example implementations, the plurality of sensors 100 includes one or more image sensors that output data that includes images, as opposed to merely measurement of physical parameters (light, etc.). While a still or video "image" is traditionally not considered to be a physical parameter, the present disclosure explicitly contemplates the use of image sensors to output images (still or moving) that can be subject to further analysis as described herein.

The sensors 100 can communicate with various other devices via network 400. As mentioned above, the network 400 can include any form of local area network (LAN), wide area network (WAN), e.g., the Internet, or a combination thereof, to which the sensors 100, server 200 and/or user computing device 300 are connected through a wired and/or wireless connection. Furthermore, the network 400 is intended to include any mechanism or process through which two devices can communicate. In some aspects, the sensors 100 can communicate directly to the server computing device 200. In other aspects, and as discussed further below, the sensors 100 can communicate with one or more intermediate node devices 240 (see FIG. 3).

With further reference to FIG. 3, the server computing device 200 can include one or more processors 205, as well as a memory device 210 (e.g., a non-transitory computer-readable medium), which can take any form of memory or storage device, specifically including but not limited to a database (such as database 250) or similar structure. The server computing device 200 can also include an Activity Model 215, an Occupancy Model 220, and/or an Interest Model 225. As mentioned and further discussed below, these models 215, 220, 225 can be utilized to generate and predict indicators of activity, occupancy, and interest, respectively.

The system 10 may also include one or more intermediate node devices 240. The intermediate node devices 240 can act as managers of the sensors 100. The intermediate node devices 240 can maintain in communication with the sensors 100, to receive data at specific time intervals or to listen and wait for data from the sensors 100 based on triggers or changes when the sensors 100 proactively send data. In some aspects, each intermediary node device 240 can act as a data processor and perform various pre-processing and pre-computing activities with respect to the received data, before transmitting the data to the server computing device 200 and its various models. While FIG. 3 illustrates a direct communication connection between the server computing device 200 and the intermediate node devices 240, it should be appreciated that a network-based communication connection (e.g., via the network 400) or indirect connection type is within the scope of this disclosure. It should also be appreciated that, although FIGS. 2-3 show a communication connection between the sensors 100 and the intermediate node devices 240 as a network-based communication connection (e.g., via the network 400), a direct or other indirect connection type is specifically intended to be included within the scope of this disclosure.

The pre-processing activities can include data transformation operations such as data compression, formatting data to specific data model structures, addition of certain metadata such as batch statistics (minimum, maximum, average, count values of a batch of data related to the time-series or aggregation of each sensed data parameter), timestamps, geolocation stamps, nearby user identification and footprint data, and business information. In some implementations, the sensors 100 can also perform some of the minor data pre-processing and pre-computations as directed by the server computing device 200 to reduce to the computation load of the intermediate node devices 240 and the server computing device 200.

The server computing device 200, in conjunction with or separate from the sensors 100 and/or intermediate node devices 240, can generate one or more synthetic variables based on the data received from the sensors 100. A synthetic variable can be any form of processed or combined data that cannot be directly sensed by the sensors 100 without processing or combination. Each synthetic variable can correspond to one or more physical parameters and represent a processed or combined value of the sensed values.

In one aspect, an example synthetic variable can be a variable that represents an estimation of change per unit time for its corresponding physical parameters. For example only, synthetic variables that correspond to the physical parameter of temperature can include the average temperature over a given time period, the number of changes (over a detectable threshold amount of change) in temperature over a given time, as well as a temperature gradient between two or more sensors 100. In yet another example, another synthetic variable that corresponds to the physical parameter of distance can be the change in distance over a time period, or the amount of time in which the distance remains constant.

The server computing device 200 can store, e.g., in the memory device 210 associated with the server computing device 200, the received data as well as any synthetic variables that have been generated. Furthermore, the server computing device 200 can utilize some or all of the received data and/or synthetic variables to generate the indicators for activity, occupancy, and/or interest, as further described below.

As briefly mentioned above, the Activity Model 215, Occupancy Model 220, and/or Interest Model 225 can be machine learning models that are trained to be able to determine and predict a level of activity, occupancy, and interest, respectively, based on the received data and synthetic variables. Each of these models 215, 220, 225 can include a regression model and/or a classification model. In such a regression model, the level of interest, activity, or occupancy can be determined as a value between 0 and 1 that is representative of the one or more indicators. In a classification model, however, the level of interest, activity, or occupancy can be determined and classified into at least one of a plurality of categories (e.g., high, medium, low).

In one implementation, the Activity Model 215, Occupancy Model 220, and the Interest Model 225 are trained based on a training set of labeled data, in what is commonly referred to as supervised learning. It should be appreciated that the models 215, 220, 225 can be trained in other manners, for example, by using a semi-supervised or unsupervised learning process. For example only, the models 215, 220, 225 can be trained using a training set of labeled data that is generated manually by human survey. As an example, an Analytic Hierarchy Process ("AHP") can be utilized to determine weights for each of the physical parameters as they relate to the levels of interest, activity, and occupancy. A proportional relation transformation of variables can also be used, where those parameters that are directly proportional to the level being determined can be used directly, and the inverse of a parameter can be used when the parameters are inversely proportional to the level being determined.

In one example implementation, an initial estimate of the level of activity, occupancy, and interest based on heuristics and used for training purposes can be determined based on the following equation:

$$Y_h = \theta_1 * x_1 + \theta_2 * x_2 + \ldots + x_n$$

where $Y_h$ is the heuristic-based value of the level of activity, occupancy, and/or interest, $x_n$ is a value related to the n-th physical parameter, and $\theta_n$ is the weight that corresponds with the n-th physical parameter ($x_n$). As mentioned above, the $\theta$ for each of the physical parameters can be determined manually, e.g., by AHP, or by any other process.

In some implementations, it may be useful to supplement the heuristic-based value with a count-based value of the level of interest, activity, and occupancy. The count-based value represents the number of devices in the physical location 500. In one aspect, the count-based value can be determined by sensing unique radio signals emitted by electronic devices in the physical location 500. For example only, each person in a physical location such as a retail store may have a mobile phone, a tablet computer, a wearable computing device (smartwatch, etc.), and/or a laptop computer that is utilizing a WiFi, Bluetooth, or other radio signal communication method. The sensors 100 can sense these signals and count the number of unique devices. In one aspect, the system 10 can determine a count by: (1) determining the number of devices emitting a WiFi signal, (2) determining the number of devices emitting a Bluetooth signal, (3) determining the number of devices emitting both WiFi and Bluetooth signals, (4) adding the numbers from (1) and (2) above and subtracting the number from (3) above, in order to determine the number of unique devices and to avoid double counting. In further aspects, the count-based value can alternatively or additionally be generated and/or validated by a manual count, that is, by obtaining human observed counts of people.

The determined $Y_h$, $Y_c$, and/or $Y_a$ values, the sensed physical parameters and synthetic variables can be associated together to comprise the training set of labeled data upon which the models 215, 220, and 225 can be trained and validated. The training set can additionally or alternatively include direct manually labeled data (e.g., by human observation), such as human-assigned indicators of the level of interest, activity, and/or occupancy, in the training set. In this manner, each of the models 215, 220, 225 can be generated and configured to determine one or indicators of the level of interest, activity, and/or occupancy, as described herein.

In some aspects, the indicators of the level of activity, occupancy, and/or interest can be determined based on a combination of the heuristic-based value and the count-based value described above. For example only, in one example the level of activity, occupancy, and/or interest can be determined based on the following equation:

$$Y_{total} = Y_h * a_h + Y_c * a_c$$

where $Y_{total}$ is the combined indicator of the level of activity, occupancy, and/or interest, $Y_h$ is the heuristic-based value of the level of activity, occupancy, and/or interest, $Y_c$ is the count-based value of the level of activity, occupancy, and/or interest, and $a_h$ and $a_c$ are weights that correspond with the heuristic-based value and the count-based value, respectively. In this example, the weights, $a_h$ and $a_c$, can be determined/chosen in any of a number of possible manners, e.g., the weights can be calibrated for a particular location or can be subjectively chosen.

As alluded to above, and as shown in FIG. 3, the system 10 can further include and/or be in communication with at least one interactive computing device 600 that is configured to perform interaction activities. Such interaction activities include, but are not limited to, displaying an image or message (e.g., on a display associated with the interactive computing device 600), handling a payment transaction, controlling a switch (e.g., associated with a lighting device), controlling an audio device, or any other functionality. The server computing device 200 can analyze the one or more indicators according to a set of interaction rules that associate one or more interaction activities with predetermined criteria related to the one or more indicators. When the one or more indicators meet the predetermined criteria, the server computing device 200 can output a command to the interactive computing device 600 based on the interaction rules. The command can cause the interactive computing device 600 to perform the prescribed one (or more) interaction activities.

For example only, if the activity indicator meets the predetermined criteria (e.g., is greater than a threshold level of activity for a certain time period), the server computing device 600 can command the interactive computing device 600 to output an image included in the command on its associated display to attract the attention of people outside of the physical location in order to, for example, increase the level of activity at the physical location. It should be appreciated that other types of interaction activities are included within the scope of the present disclosure. Further, while the sensors 100 and the interactive computing device(s) 600 are illustrated as being separate devices, it should also be appreciated that the sensors 100 can be integrated within, or be a component or components of, the interactive computing device(s) 600.

In addition to generating the one or more indicators for a level of interest, activity, and occupancy, the system 10 can be used to generate one or more future indicators for a level of interest, a level of activity, and/or a level of occupancy. For example only, once in operation, the machine learning models 215, 220, 225 can be trained to correlate level(s) of interest, activity, and/or occupancy at a certain time with the received data and synthetic variables from a time before the certain time. In this manner, the models 215, 220, 225 can be tuned to predict one or more future indicators based on currently received data and synthetic variables.

It should be noted that, while the one or more indicators of the level of interest, activity, and occupancy at a physical location 600 have been described as being generated based on the same physical parameters and synthetic variables, the present disclosure contemplates that the different models 215, 220, 225 may instead utilize not only different weights, equations, etc., but also different parameters and/or variables to determine the different features.

For example only, it is specifically noted that the Interest Model 225 can utilize a synthetic variable related to an amount of time that a person is within a range of distance from a sensor 100 to assist in the determination of an indicator of the level of interest. In this example, this synthetic variable would be based on a reasonable assumption that a person who is relatively stationary for a duration of time, e.g., in front of a product for sale or an advertisement, may have a relatively higher level of interest in the physical location 600 than a person who is in constant motion and moves through the physical location quickly.

Upon generation of the one or more indicators, the server computing device 200 can further output these indicators, e.g., to a user computing device 300. The user computing device 300 can receive these indicators and output them, e.g., via a user interface. The user interface at the user computing device 300 can display or otherwise provide these indicators to a user 350 in any number of ways. For example only, the indicators (or their manner of display in the user interface at the user computing device 300) can include: compiled statistics, one or a combination of time-series charts, heat maps, scattered point charts, bar charts, pie charts, graph charts, digital area maps, satellite maps, terrain maps, building architectural maps and other such data visualization techniques. The user interface can also provide feature tags, search boxes, lists, and drop down buttons and menus, and other selection methods to filter through the determined indicators and/or access indicators related to a specific location, time, product, person, promotional and advertisement campaign, and other categories. It is also contemplated that the server computing device 200 can, in certain implementations, provide access to the raw received data for the user computing device 300.

Figure 4:
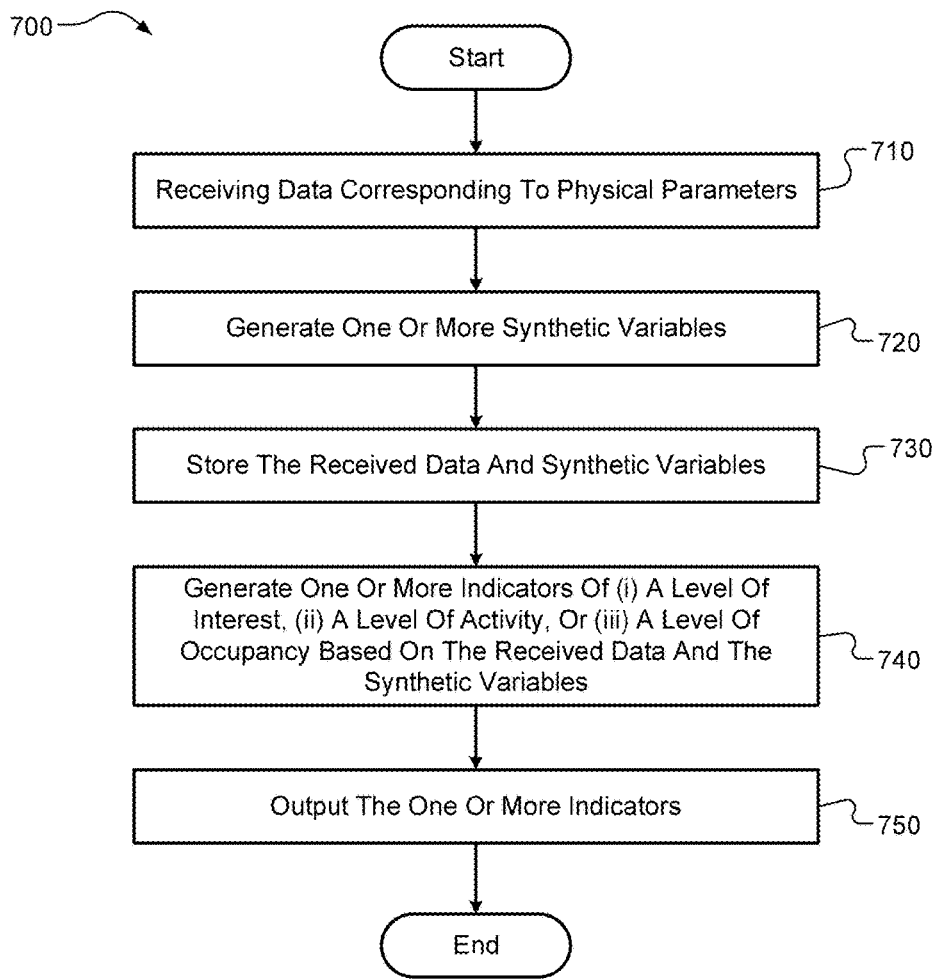
FIG. 4 is a flow diagram of an example method of estimating interest in, activity at and/or occupancy of a physical location according to some embodiments of the present disclosure.

Referring now to FIG. 4, a flow diagram of an example method 700 of estimating interest in, activity at and/or occupancy of a physical location according to some embodiments of the present disclosure is illustrated. The method 700 will be described as being performed by the system 10 (including the sensors 100 and the server computing device 200), but it should be appreciated that the method (or any portion thereof) can be performed by different systems or different individual components of the system 10. At 710, the server computing device 200 can receive data corresponding to physical parameters sensed by a plurality of sensors 100 at a physical location 600. The physical parameters can include temperature, humidity, pressure, sound, distance to an object, visible light, infra-red light, motion of objects, acceleration, magnetic field, vibration, and/or radio signals. The server computing device 200 can generate (at 720) one or more synthetic variables based on the received data. Each synthetic variable can correspond to one or more physical parameters and can represent a processed or combined value for its corresponding physical parameters. As mentioned above, while each of the individual physical parameters may not strongly correlate with the levels of activity, occupancy, and/or interest, it has been shown that the aggregation of the plurality of physical parameters (via the sensed data and various synthetic variables) as a group results in meaningful and accurate relative estimation of the levels of interest, occupancy, and/or activity.

At 730, the server computing device 200 can store, in a memory device 210 associated with the server computing device 200, the received data and the generated synthetic variables. The server computing device 200 can further generate one or more indicators for: (i) a level of interest, (ii) a level of activity, or (iii) a level of occupancy at the physical location 600 at 740. The one or more indicators can be generated based on the received data and the one or more synthetic variables by utilizing a machine learning model, such as an Activity Model 215, an Occupancy Model 220, and/or an Interest Model 225. At 750, the server computing device 200 can output the one or more indicators, e.g., to a user computing device 300, where the indicators can be displayed in a user interface or otherwise.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for determining levels of interest, activity, or occupancy at a physical location, comprising:
   receiving, at a server computing device having one or more processors, data corresponding to physical parameters sensed by a plurality of sensors at the physical location, wherein the physical parameters include temperature, humidity, pressure, sound, distance to an object, visible light, infra-red light, motion of objects, acceleration, magnetic field, vibration, and radio signals;
   generating, at the server computing device, one or more synthetic variables based on the received data, each synthetic variable corresponding to one or more physical parameters and representing a processed or combined value for its corresponding physical parameters;
   storing, by the server computing device and in a memory device associated with the server computing device, the received data and generated synthetic variables;
   generating, at the server computing device, one or more indicators for: (i) a level of interest, (ii) a level of activity, or (iii) a level of occupancy at the physical location based on the received data and the one or more synthetic variables by utilizing a machine learning model; and
   outputting, from the server computing device, the one or more indicators to a user computing device for display in a user interface.

2. The computer-implemented method of claim 1, wherein the machine learning model includes a regression model and a classification model, the regression model configured to generate a value between 0 and 1 that is representative of the one or more indicators and the classification model configured to classify the one or more indicators into at least one of a plurality of categories.

3. The computer-implemented method of claim 1, further comprising:
   analyzing, at the server computing device, the one or more indicators according to a set of interaction rules, the set of interaction rules associating one or more interaction activities with predetermined criteria related to the one or more indicators; and
   outputting, from the server computing device, a command to an interactive computing device at the physical location when the one or more indicators meet the predetermined criteria based on the set of interaction rules, the command causing the interactive computing device to perform one of the interaction activities.

4. The computer-implemented method of claim 3, wherein the interactive computing device includes a display, the command includes an image, and receipt of the command by the interactive computing device causes the computer display to display the image.

5. The computer-implemented method of claim 1, wherein the data corresponding to the physical parameters further includes time and location corresponding to each of the physical parameters, and wherein generating the one or more indicators is further based on one or more application variables corresponding to the physical location.

6. The computer-implemented method of claim 1, further comprising predicting, at the server computing device, one or more future indicators for: (i) a level of interest, (ii) a level of activity, or (iii) a level of occupancy at the physical location based on the received data and the one or more synthetic variables by utilizing the machine learning model.

7. The computer-implemented method of claim 1, wherein the plurality of sensors includes one or more image sensors and the data further includes images.

8. The computer-implemented method of claim 1, further comprising training the machine learning model, wherein the training includes:
   determining a heuristic-based value of the level of interest, activity, or occupancy based on data corresponding to physical parameters sensed by the plurality of sensors at the physical location data for each of a plurality of training scenarios;
   determining a count-based value of the level of interest, activity, or occupancy based on radio signal data at the physical location data for each of the plurality of training scenarios;
   combining the heuristic-based value and the count-based value to generate one or more indicators of the level of interest, activity, or occupancy for each of the plurality of training scenarios;
   creating a labeled training set based on the one or more indicators; and
   training the machine learning model based on the labeled training set.

9. The computer-implemented method of claim 8, wherein the heuristic-based value of interest, activity, or occupancy is determined based on an Analytic Hierarchy Process.

10. The computer-implemented method of claim 1, wherein the server computing device comprises one more intermediate node devices that receive the data from the plurality of sensors and that generate the one or more synthetic variables.

11. A computing system for determining levels of interest, activity, or occupancy at a physical location, comprising:
  a server computing device having one or more processors;
  a non-transitory computer-readable medium storing instructions that, when executed by the one or more processors, cause the server computing device to perform operations including:
    receiving data corresponding to physical parameters sensed by a plurality of sensors at the physical location, wherein the physical parameters include temperature, humidity, pressure, sound, distance to an object, visible light, infra-red light, motion of objects, acceleration, magnetic field, vibration, and radio signals;
    generating one or more synthetic variables based on the received data, each synthetic variable corresponding to one or more physical parameters and representing a processed or combined value for its corresponding physical parameters;
    storing, in a memory device associated with the server computing device, the received data and generated synthetic variables;
    generating one or more indicators for: (i) a level of interest, (ii) a level of activity, or (iii) a level of occupancy at the physical location based on the received data and the one or more synthetic variables by utilizing a machine learning model; and
    outputting the one or more indicators to a user computing device for display in a user interface.

12. The computing system of claim 11, wherein the machine learning model includes a regression model and a classification model, the regression model configured to generate a value between 0 and 1 that is representative of the one or more indicators and the classification model configured to classify the one or more indicators into at least one of a plurality of categories.

13. The computing system of claim 11, wherein the operations further include:
  analyzing the one or more indicators according to a set of interaction rules, the set of interaction rules associating one or more interaction activities with predetermined criteria related to the one or more indicators; and
  outputting a command to an interactive computing device at the physical location when the one or more indicators meet the predetermined criteria based on the set of interaction rules, the command causing the interactive computing device to perform one of the interaction activities.

14. The computing system of claim 13, wherein the interactive computing device includes a display, the command includes an image, and receipt of the command by the interactive computing device causes the computer display to display the image.

15. The computing system of claim 11, wherein the data corresponding to the physical parameters further includes time and location corresponding to each of the physical parameters, and wherein generating the one or more indicators is further based on one or more application variables corresponding to the physical location.

16. The computing system of claim 11, wherein the operations further include predicting one or more future indicators for: (i) a level of interest, (ii) a level of activity, or (iii) a level of occupancy at the physical location based on the received data and the one or more synthetic variables by utilizing the machine learning model.

17. The computing system of claim 11, wherein the plurality of sensors includes one or more image sensors and the data further includes images.

18. The computing system of claim 11, wherein the operations further comprise training the machine learning model, wherein the training includes:
  determining a heuristic-based value of the level of interest, activity, or occupancy based on data corresponding to physical parameters sensed by the plurality of sensors at the physical location data for each of a plurality of training scenarios;
  determining a count-based value of the level of interest, activity, or occupancy based on radio signal data at the physical location data for each of the plurality of training scenarios;
  combining the heuristic-based value and the count-based value to generate one or more indicators of the level of interest, activity, or occupancy for each of the plurality of training scenarios;
  creating a labeled training set based on the one or more indicators; and
  training the machine learning model based on the labeled training set.

19. The computing system of claim 18, wherein the heuristic-based value of interest, activity, or occupancy is determined based on an Analytic Hierarchy Process.

20. The computing system of claim 11, further comprising one more intermediate node devices that receive the data from the plurality of sensors and that generate the one or more synthetic variables.

* * * * *